United States Patent
Mitchell et al.

[19]

[11] Patent Number: 6,133,872
[45] Date of Patent: Oct. 17, 2000

[54] REAL TIME PRECISION ORBIT DETERMINATION SYSTEM

[75] Inventors: Scott Mitchell, Louisville; Skip Cubbedge, Boulder, both of Colo.

[73] Assignee: Ball Aerospace & Technologies Corp., Boulder, Colo.

[21] Appl. No.: 08/953,704

[22] Filed: Oct. 17, 1997

[51] Int. Cl.[7] .............................. H04B 7/185; G01S 5/02
[52] U.S. Cl. ................................ 342/357.1; 342/357.09; 701/226
[58] Field of Search ........................... 342/357.1, 357.09; 701/226

[56] References Cited

U.S. PATENT DOCUMENTS

| | | | |
|---|---|---|---|
| 4,812,991 | 3/1989 | Hatch | 364/458 |
| 4,870,422 | 9/1989 | Counselman, III | 342/357 |
| 4,963,889 | 10/1990 | Hatch | 342/357 |
| 5,014,066 | 5/1991 | Counselman, III | 342/352 |
| 5,041,833 | 8/1991 | Weinberg | 342/357 |
| 5,072,227 | 12/1991 | Hatch | 342/357 |
| 5,126,748 | 6/1992 | Ames et al. | 342/353 |
| 5,177,489 | 1/1993 | Hatch | 342/357 |
| 5,202,829 | 4/1993 | Geier | 364/449 |
| 5,252,982 | 10/1993 | Frei | 342/357 |
| 5,323,322 | 6/1994 | Mueller et al. | 364/449 |
| 5,379,224 | 1/1995 | Brown et al. | 364/449 |
| 5,390,124 | 2/1995 | Kyrtsos | 364/449 |
| 5,430,657 | 7/1995 | Kyrtsos | 342/457 |
| 5,442,363 | 8/1995 | Remondi | 342/357 |
| 5,477,458 | 12/1995 | Loomis | 364/449 |
| 5,504,492 | 4/1996 | Class et al. | 342/357 |
| 5,506,588 | 4/1996 | Diefes et al. | 342/357 |
| 5,519,620 | 5/1996 | Talbot et al. | 364/449 |
| 5,534,875 | 7/1996 | Diefes et al. | 342/357 |
| 5,543,804 | 8/1996 | Buchler et al. | 342/357 |
| 5,546,309 | 8/1996 | Johnson et al. | 364/434 |
| 5,548,293 | 8/1996 | Cohen | 342/357 |
| 5,862,495 | 1/1999 | Small et al. | 701/226 |
| 5,935,196 | 8/1999 | Brodie et al. | 701/226 |

OTHER PUBLICATIONS

Yunck et al., "Precise Tracking of Remote Sensing Satellites With the Global Positioning System," pp. 108–116, *IEEE Transactions on Geoscience and Remote Sensing*, vol. 28, No. 1 (Jan. 1990).

Cubbedge et al., "Design, Integration, and Test of a GPS Receiver on an Inertially Pointed Satellite: A Case Study," pp. 1701–1710.

Davis, "GPS–Based Precision Orbit Determination for Low Altitude Geodetic Satellites," Univ. of Texas at Austin (May 1996).

Gold et al., "Precision Orbit Determination in the Geosat Orbit," pp. 579–591, proceedings of ION GPS 94 Meeting, Salt Lake City, Utah (Sep. 1994).

Mitchell, et al., "Navigation Solution Accuracy from a Spaceborne GPS Receiver," pp. 42–50, *GPS World* (Jun. 1996).

*Primary Examiner*—Theodore M. Blum
*Attorney, Agent, or Firm*—Sheridan Ross P.C.

[57] ABSTRACT

The present invention relates to a system for providing highly accurate position estimates for a vehicle in space, in substantially real time. The system includes a Mission Control Center (MCC) that calculates precise orbits for GPS satellites that are in view of the vehicle, using GPS tracking data from the worldwide network of tracking sites. Because the tracking data from the tracking sites is not current when received by the MCC, the precise GPS orbits are "propagated forward in time" by the MCC. The propagated orbit information is uploaded to the user satellite where it is processed in an extended Kalman filter, or similar device, along with the real time output of the on-board GPS receiver, to achieve highly accurate satellite location estimates in substantially real time.

38 Claims, 2 Drawing Sheets

REAL TIME PRECISION ORBIT DETERMINATION SYSTEM

FIELD OF THE INVENTION

The present invention relates in general to space systems and, more particularly, to systems for accurately estimating the location of vehicles in space.

BACKGROUND OF THE INVENTION

Systems for estimating the location of vehicles in space are known. Some of these systems rely upon the Global Positioning System (GPS) to obtain an accurate position estimate of a space vehicle of interest. The GPS system comprises a constellation of satellites that each revolve about the earth in a fixed orbit. The GPS system presently comprises 24 satellites, including 21 navigational space vehicles (SVs) and 3 active spare vehicles, that revolve around the earth in 12 hour orbits. The SVs are arranged in six orbital planes that are equally spaced from one another (i.e., neighboring orbital planes are 60 degrees apart).

The GPS system also includes a network of ground based tracking stations that are located at various locations around the world. These tracking stations receive signals from the navigational SVs and transfer the signals to a central location. The central location uses orbital models to compute orbital data (known as ephemerides) and clock corrections related to the navigational SVs. This information is then uploaded to the SVs via a radio frequency uplink. The navigational SVs then broadcast portions of the ephemerides for use in determining the position of a point of interest (POI). The transmitted information is known as the navigation message.

To estimate the position of a point of interest, the navigation message from four or more SVs must be received at the POI and appropriately processed. These functions are generally performed by a GPS receiver located at the POI. The GPS can estimate the position of virtually any point that is capable of receiving the navigation message from at least four navigational SVs. The POI can be located on the earth's surface (such as on land or on a vessel at sea) or above the earth's surface (such as aboard an aircraft or space vehicle).

In many applications, the accuracy bf the location estimate achieved by the above-described system is inadequate. For example, the ephemerides transmitted by the navigational SVs normally provide an accuracy from 15–100 meters. This would not be acceptable in high-accuracy applications, such as some remote sensing applications, that require an accuracy of 10 cm or less. Therefore, methods must be developed to increase the accuracy of the estimates to service these applications.

One known method uses a post processing mode of operation to achieve highly accurate GPS estimates for locating satellites in space. This method has been successfully implemented to provide highly accurate satellite location estimates in NASA's Topex oceanographic mission. The method comprises collecting and archiving GPS tracking data from the worldwide network of tracking sites. At the same time, the user satellite to be located collects and stores GPS tracking data from an on-board GPS receiver. A Mission Control Center obtains the GPS tracking data from the tracking sites and the user satellite and processes the data to obtain orbit data for both the GPS satellites and the user satellite. Because information from both the tracking sites and the user satellite is processed concurrently (i.e., a joint solution is obtained), higher position accuracy is achieved. A description of a system which uses this approach is found in "Precise Tracking of Remote Sensing Satellites With the Global Positioning System" by Yunck et al., IEEE Transactions on Geoscience and Remote sensing, vol. 28, no. 1, January 1990, which is incorporated by reference herein. Because the data from the tracking sites is only available at specific times (e.g., in 24 hour blocks), the precise orbit information resulting from the processing is typically available a day or two after the observation. While this delay is acceptable in some applications, other applications require data that is more current.

In another known method, differential techniques are used to achieve accurate orbit estimates for a space system. In a differential system, one or more reference stations on the ground receive navigation messages from multiple GPS satellites within view and calculate corrections based on the known location of the reference station(s). The reference station(s) then broadcasts the corrections to a surrounding area for use in correcting the position solutions calculated by roving GPS receivers in the area. Because the correction is based on the location of the reference station, the accuracy of this method decreases as the distance between the roving GPS receiver and the reference station increases. In addition, the method requires a means for broadcasting the corrections over a relatively large area, which can be costly.

Therefore, a need exists for a method and apparatus for estimating the position of a vehicle in space that is both highly accurate and capable of providing results that are more current than systems of the past. In addition, a need exists for a system that provides an accuracy that does not depend on the distance between a GPS receiver and a reference station. Further, a need exists for a positioning system capable of high positional accuracy without the need for costly correction broadcast means. It is desirable that the system be capable of providing results in substantially real time.

SUMMARY OF THE INVENTION

The present invention relates to a system for providing highly accurate position estimates for vehicles in space, in substantially real time. In a preferred embodiment, the invention is used to estimate the current orbit of a user satellite in space. The system includes a ground based Mission Control Center (MCC) that calculates precise orbits for GPS satellites using GPS tracking data from a worldwide network of tracking sites. Because the tracking data is not current when received by the MCC, the precise GPS orbits are then "propagated forward in time." The term "propagated forward in time" means that the GPS orbits are predicted for future times using known orbital data. The propagated orbit information is then uploaded to the user satellite where it is processed in a Kalman filter, or similar device, along with the real time output of the on-board GPS receiver, to achieve highly accurate satellite location estimates in substantially real time.

In one aspect of the present invention, a method is provided for estimating the orbit information of a space system. More specifically, the method includes the steps of: (a) obtaining first orbit information relating to positions of a plurality of space vehicles at a first time; (b) predicting, using the first orbit information, second orbit information relating to positions of the plurality of space vehicles at a second time, wherein the second time occurs after the first time; (c) providing third orbit information relating to positions of the space vehicles at a third time, wherein the third orbit information is different from the first and second orbit information; and (d) using the second and third orbit information to estimate orbit data for a space system that is not part of the plurality of space vehicles.

In a preferred embodiment of the invention, the plurality of space vehicles includes satellites in the Global Positioning System (GPS). The obtaining step can include, for example, receiving data at a control center from a plurality of tracking sites. The data can represent, for example, data received by the tracking sites (such as navigation messages) from GPS satellites. The obtaining step can also include processing the data from the tracking sites to obtain the first orbit information, although the data may already be processed when received by the control center. The predicting step can include, for example, propagating the first orbit information forward in time. This step is preferably performed on the ground, such as at the control center, but can also be performed on the space system.

The providing step can include virtually any method of providing orbit information relating to the plurality of space vehicles. In a preferred embodiment, the providing step includes receiving information, such as navigation message information, at a GPS receiver on board the space system. The step of using includes processing the second and third orbit information to obtain an orbit estimate for the space system. In one embodiment, the processing takes place in a Kalman filter on board the space system. The processing can also take place on the ground or at another location. The invention is capable of estimating orbit data for the space system in substantially real time.

In another aspect of the present invention, a system for estimating orbit information for a space system is provided. More specifically, the system comprises: (a) means for obtaining first orbit information relating to a plurality of satellites; (b) means for propagating the first orbit information forward in time to obtain second orbit information; (c) means for acquiring third orbit information relating to the plurality of satellites, wherein the third orbit information is different from the first orbit information; and (d) means for processing the second orbit information and the third orbit information to estimate orbit data for a space system that is not part of the plurality of satellites.

The means for obtaining first orbit information can include a ground based control center that receives GPS satellite data from a plurality of tracking sites. The control center can include means for processing the data to obtain orbit information for the GPS satellite. The means for propagating can include, for example, a computer system running prediction software. Preferably, the means for propagating is located on the ground, such as at the control center, but it can also be located on the space system or at another location. In one embodiment, the means for acquiring second orbit information includes a GPS receiver on board the space system that receives navigation messages from a plurality of GPS satellites. The means for processing can include a Kalman filter or other device for combining the second orbit information with the third orbit information to obtain highly accurate orbit data for the space system. The means for processing can be located on the ground or, more preferably, on the space system. In a preferred embodiment, the orbit data is achieved in real time.

In another aspect of the present invention, a method for determining real time orbit information of a space system is provided. More specifically, the method comprises: (a) providing first orbit information generated using first processing means based on first orbit data; (b) obtaining second orbit information using second processing means based on second orbit data, the second processing means being different from the first processing means; and (c) determining real time orbit information of the space system using both of the first orbit information and the second orbit information, wherein the accuracy of the real time orbit information does not depend on the relative location of the space system with respect to a ground based reference location.

The step of providing can include virtually any method of providing first orbit information, such as by use of a GPS receiver. In a preferred embodiment, the providing step includes the generation of GPS orbit information in a ground control center. The orbit information can be propagated forward in time at the control center, or elsewhere as part of the providing step. The step of obtaining can also include virtually any method of obtaining orbit information. In a preferred embodiment, the obtaining step includes receiving GPS navigation messages in a GPS receiver from a plurality of GPS satellites. The step of determining can include using a Kalman filter to process the first orbit information and the second orbit information to obtain real time orbit information for the space system. The accuracy of the real time orbit information does not depend on the distance from a reference location as it does in differential GPS systems. The first processing means and the second processing means can be located at positions remote from one another in accordance with the invention.

In another aspect of the present invention, an apparatus for determining real time orbit information of a space system is provided. More specifically, the apparatus includes: (a) first means for providing first orbit information, the first means including processing means for processing first orbit data input to the first processing means; (b) second means for obtaining second orbit information, the second means including second processing means for processing second orbit data, wherein the second processing means is different from the first processing means and the second orbit data is different from the first orbit data; and (c) third means for determining real time orbit information of the space system using both of the first orbit information and the second orbit information, wherein the accuracy of the real time orbit information does not depend on the relative location of the space system with respect to a ground based reference location.

The first means can include, for example, a ground based control center that is capable of processing data from a plurality of GPS satellites. The second means can include, for example, a GPS receiver located on the space system. The GPS receiver receives data, such as navigation messages from a plurality of GPS satellites. The third means can include, for example, a Kalman filter located on the space system or elsewhere for processing the first and second orbit information. The accuracy of the real time orbit information does not depend on the distance from a reference location as in systems using differential techniques.

In yet another aspect of the present invention, a method for determining real time orbit information of a space system is provided. More specifically, the method comprises: (a) obtaining, at a control center, first orbit information relating to a plurality of space vehicles; (b) processing, at the control center, the first orbit information to create second orbit information relating to the plurality of space vehicles; (c) uploading the second orbit information to the space system; (d) receiving third orbit information relating to the plurality of space vehicles directly from the plurality of space vehicles at the space system, wherein the third orbit information is different from the second orbit information; and (e) using the second orbit information and the third orbit information to estimate orbit information of the space system in substantially real time.

The first orbit information can include GPS orbit information for a plurality of GPS satellites. The orbit information is preferably determined at the control center using GPS tracking data received from a plurality of GPS tracking sites. In a preferred embodiment, the processing step includes propagating the first orbit information forward in time. The step of uploading is preferably performed by an rf link between the control center and the space system, but can also be performed by other methods such as an uplink between the control center and another space vehicle and a crosslink between the other space vehicle and the space system. The method of uploading used does not have to be real time. The step of using can include applying the first and third orbit information to a Kalman filter.

DETAILED DESCRIPTION

The present invention relates to a system that is capable of estimating the orbit of a user satellite to a high degree of accuracy in substantially real time. In its preferred embodiment, the system is capable of achieving an accuracy of 1m or less. The system is suitable for use in satellite applications that require highly accurate and current position information, such as some remote sensing applications. The system is of particular value for use in orbit determination for satellites in low earth orbit, such as orbits of 3000 kilometers and below.

Figure 1:
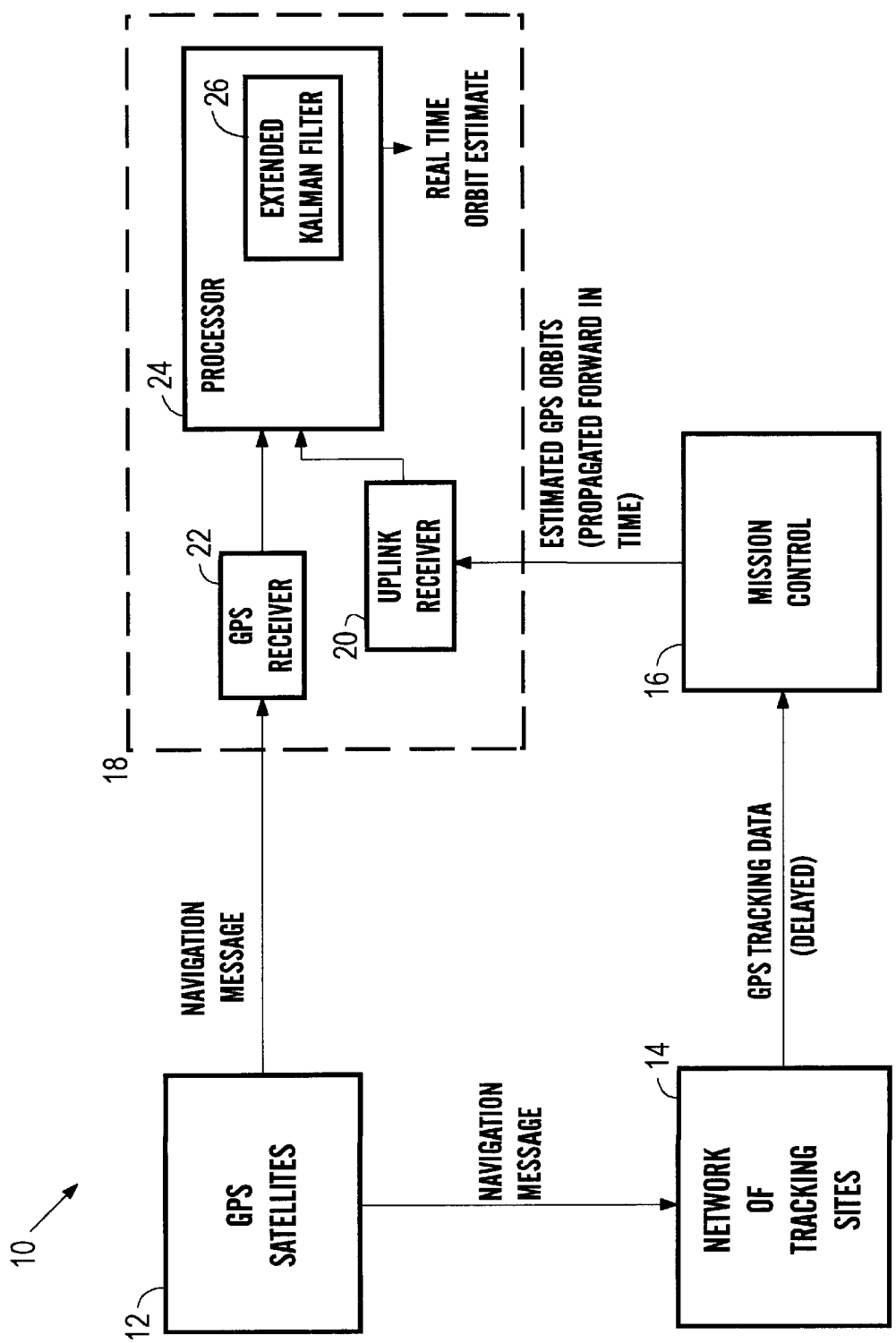
FIG. 1 is a block diagram of an orbit determination system in accordance with the present invention.

FIG. 1 is a block diagram of an orbit determination system 10 in accordance with one embodiment of the present invention. The system 10 includes a constellation of GPS satellites 12, a network of ground tracking sites 14, a mission control center 16, and a user satellite 18 for which orbit data is desired. The current GPS system includes twenty-four GPS satellites orbiting the earth in six nearly circular orbital planes with an inclination of 55 degrees. The constellation provides global coverage with four to eight simultaneously observable satellites at any time of day using a 15 degree elevation mask. The GPS satellites orbit the earth at an altitude of approximately 20,200 kilometers. It should be appreciated that other satellite location systems, including future GPS revisions, can also be utilized in accordance with the present invention.

The network of tracking sites 14 are geographically distributed on the earth's surface. Each ground tracking site includes a ground tracking station that monitors all GPS satellites within its view. The tracking stations receive a navigation message and carrier phase data from each of the observable GPS satellites and store the information for later use. The navigation message includes information such as orbital parameters, satellite clock readings, satellite health status, and correction data. The information received by the tracking stations is generally downloaded to a central GPS facility and is available upon request.

The mission control center (MCC) 16 is an instrumentality dedicated to facilitating the accurate estimation of the user satellite orbit. That is, in the preferred embodiment of the invention, the MCC 16 is not part of the GPS, although it may be located at a GPS facility. A single MCC can be provided for each user satellite for which position is desired or one MCC can service multiple user satellites. In some applications, the MCC 16 can consist of a single desktop or laptop computer having the appropriate communications functionality. In other applications, the MCC 16 comprises a fully functioning satellite communications installation having high level computing capabilities.

The MCC 16 retrieves the GPS satellite tracking data from the network of tracking sites 14 (or the central GPS facility as described above) and processes the information to determine accurate orbit estimates for the GPS satellites of interest (i.e., the GPS satellites that are within view of the user satellite). Because of delays inherent in the system, the MCC 16 generally receives the GPS satellite tracking data from the tracking sites well after a time when the data is current. The delays are typically on the order of one day. To make the GPS orbit estimates current, the MCC 16 uses well known prediction algorithms to propagate the GPS orbit estimates forward in time. The orbits are generally propagated forward in time a day or two, depending on the update rate of the GPS data from the ground tracking network. The process of propagating the orbit estimates forward in time reduces the accuracy of the GPS orbit estimates somewhat. However, the overall effect of using the propagated orbit estimates is increased accuracy of the user satellite position estimates in real time. The propagated GPS orbit data is uploaded to the user satellite 18 for further processing. The propagated data delivered to the satellite is generally time stamped with the time for which the estimates are predicted to be accurate.

With reference to FIG. 1, the user satellite 18 includes: an uplink receiver 20, a GPS receiver 22, and a processor 24 with an extended Kalman filter 26. The uplink receiver 20 is operative for receiving propagated GPS orbit estimates from the MCC 16 on the earth's surface. The uplink receiver 20 can also include circuitry for demodulating the propagated data so that it can be further processed in the processor 24. The GPS receiver 22 is operative for receiving the navigation data from multiple observable GPS satellites and determining pseudo ranges and carrier phase data (or other location indicia) from the received information for each of the GPS satellites. The pseudo ranges are processed to derive a coarse position estimate for the user satellite 18. The coarse position estimate is then transferred to the processor 24 for further processing.

The processor 24 receives the propagated GPS satellite orbit information from the uplink receiver 20 and the coarse position estimate from the GPS receiver 22 and uses the extended Kalman filter 26 to concurrently process the data to obtain a highly accurate orbit estimate for the user satellite. Because the GPS orbit information from the MCC 16 has been propagated forward in time and the data from the GPS receiver 22 is real time data, the orbit estimates determined by the Kalman filter 26 are produced in substantially real time. As discussed above, having a highly accurate estimate of present position is very advantageous in certain satellite applications.

A Kalman filter is a device that allows an estimate of a dynamic parameter to be updated based on further information related to the parameter. In this way, the position solution of the user satellite 18 calculated by the GPS receiver 22 can be updated based on the propagated information. Kalman filters are generally available in two types: normal Kalman filters and extended Kalman filters. The main difference between the two types is the form of reference trajectory utilized. That is, normal Kalman filters utilize a fixed reference trajectory while extended Kalman filters use a reference trajectory that is modified during operation to increase accuracy. Although the extended Kalman filter is preferred in the present invention, normal Kalman filters can also be used. The Kalman filter software also includes items such as gravity field models, coordinate transformation functionality, time transformation functionality, and radiation pressure models that are used to process the data. As Kalman filters are well known in the art, no further description of the operation of such devices will be undertaken.

Figure 2:
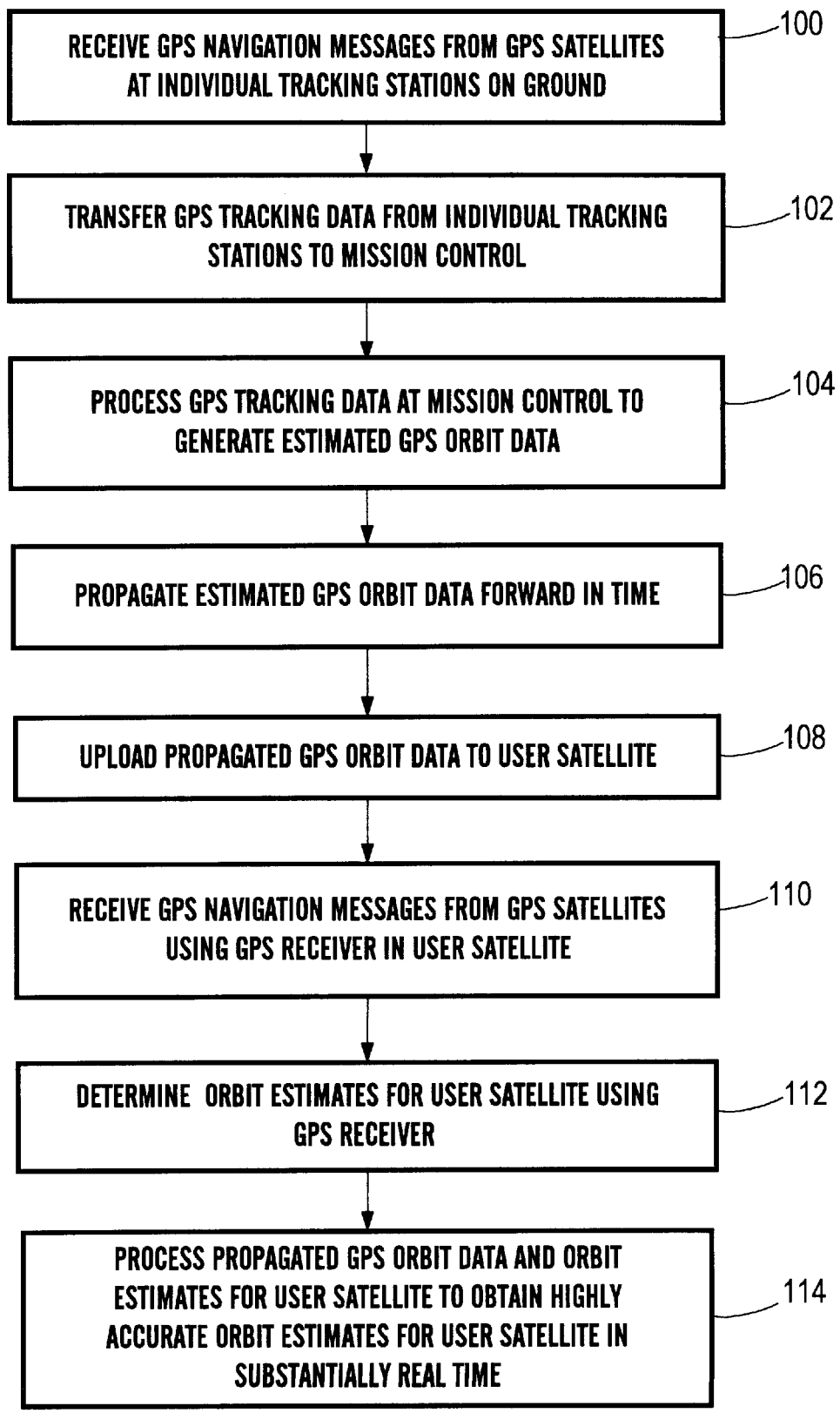
FIG. 2 is a flow chart illustrating a process for determining highly accurate orbit information for a user satellite in substantially real time in accordance with the present invention.

FIG. 2 is a flowchart outlining a method for achieving a highly accurate, real time orbit estimate in accordance with the present invention. Navigation messages are received from a plurality of GPS satellites at a plurality of ground tracking stations (step 100). Next, the data received at the tracking stations is transferred from the tracking stations to a mission control center, either directly or via a central location or locations (step 102). The data is processed at the mission control center to generate precise GPS orbit estimates (step 104). The precise GPS orbit estimates are then propagated forward in time in the mission control center or elsewhere (step 106). The propagated GPS position estimates are uploaded to the user satellite via an uplink (step 108). GPS navigation messages and carrier phase data are received in an onboard GPS receiver at the user satellite (step 110). The GPS receiver then processes the navigation messages to determine coarse orbit estimates for the user satellite (step 112). The user satellite coarse orbit estimates and GPS carrier phase data are then processed concurrently with the propagated GPS orbit estimates to achieve highly accurate orbit estimates for the user satellite in substantially real time (step 114).

Although the present invention has been described in conjunction with its preferred embodiment, it is to be understood that modifications and variations may be resorted to without departing from the spirit and scope of the invention as those skilled in the art readily understand. For example, the propagation forward in time of the GPS orbit estimates can be performed on the user satellite rather than on the ground. This can be done by equipping the user satellite with the necessary prediction software and uploading the precise GPS orbit estimates from mission control to the user satellite. For example, all of the processing could be performed on the ground, if the real-time GPS receiver data are relayed to the ground via a relay link. Such modifications and variations are considered to be within the purview and scope of the invention and the appended claims.

What is claimed is:

1. A method for estimating orbit information of a space system, comprising:
   obtaining first orbit information relating to positions of a plurality of space vehicles at a first time;
   predicting, using said first orbit information, second orbit information relating to positions of said plurality of space vehicles at a second time, wherein said second time occurs after said first time;
   providing third orbit information relating to positions of said space vehicles at a third time, wherein said third orbit information is different from said first and second orbit information; and
   using said second and third orbit information to estimate orbit data for a space system that is not part of said plurality of space vehicles.

2. The method of claim 1, wherein:
   said step of using includes estimating orbit data of said space system in substantially real time.

3. The method of claim 1, wherein:
   said steps of obtaining and predicting are performed at a first location and said step of using is performed at a second location that is different from said first location.

4. The method of claim 3, wherein:
   said step of using includes receiving said second orbit information from said first location at said second location.

5. The method of claim 3, wherein:
   said steps of obtaining is performed at a control center and said step of using is performed on said space system.

6. The method of claim 1, wherein:
   said plurality of space vehicles include Global Positioning System (GPS) satellites.

7. The method of claim 1, wherein:
   said step of obtaining includes collecting information from said plurality of space vehicles via a plurality of ground tracking stations.

8. The method of claim 1, wherein:
   said step of predicting includes propagating said first orbit information forward in time.

9. The method of claim 1, wherein:
   said step of providing includes receiving information from said plurality of space vehicles in a GPS receiver located on said space system.

10. The method of claim 1, wherein:
    said third time is the same as said second time.

11. A system for estimating orbit information for a space system, comprising:
    means for obtaining first orbit information relating to a plurality of satellites;
    means for propagating said first orbit information forward in time to obtain second orbit information relating to said plurality of satellites;
    means for acquiring third orbit information relating to said plurality of satellites, wherein said third orbit information is different from said first orbit information; and
    means for processing said second orbit information and said third orbit information to estimate orbit data for a space system that is not part of said plurality of satellites.

12. The system of claim 11, wherein:
    said means for processing estimates said orbit data in real time.

13. The system of claim 11, wherein:
    said means for processing includes a Kalman filter.

14. The system of claim 11, wherein:
    said means for obtaining is located at a ground based control center.

15. The system of claim 11, wherein:
    said means for propagating is located at a ground based control center.

16. The system of claim 15, wherein:
    said means for processing includes means for receiving said second orbit information from said control center.

17. The system of claim 11, wherein:
    said means for acquiring and said means for processing are located at said space system.

18. The system of claim 11, wherein:
    said means for acquiring includes at least one GPS receiver.

19. A method for determining realtime orbit information of a space system, comprising:

receiving first position data corresponding to a plurality of external navigation satellites in a first receiver on said space system;

receiving second position data corresponding to said plurality of external navigation satellites in a second receiver on said space system, wherein said second receiver is different from said first receiver; and determining, onboard the space system, real time orbit information of the space system using both of said first position data and said second position data, wherein the accuracy of said real time orbit information does not depend on the relative location of the space system with respect to a ground based reference location.

20. The method, as claimed in claim 19, wherein:

said first receiver includes an uplink receiver for receiving said first position data from a ground station.

21. The method, as claimed in claim 19, wherein:

said second receiver includes a global positioning system (GPS) receiver for receiving said second position data from a plurality of GPS satellites.

22. The method, as claimed in claim 19, wherein:

said plurality of external navigation satellites includes a plurality of global positioning system (GPS) satellites.

23. The method, as claimed in claim 19, wherein:

said second position data includes global positioning system (GPS) ephemerides.

24. The method, as claimed in claim 19, wherein:

said first position data includes global positioning system (GPS) satellite orbit information that has been propagated forward in time within a ground station.

25. The method, as claimed in claim 24, wherein:

said GPS satellite orbit information has been collected from a plurality of GPS tracking stations.

26. The method, as claimed in claim 19, wherein:

said step of determining includes generating a coarse position estimate for said space system using said second position data.

27. The method, as claimed in claim 19, wherein:

said step of determining includes processing said coarse position estimate and said first position data in a processing unit on-board said space system.

28. The method, as claimed in claim 27, wherein:

said processing unit includes a Kalman filter.

29. An apparatus for determining realtime orbit information of a space system, comprising:

first means for providing first orbit information corresponding to a plurality of navigation satellites, said first means including first processing means for processing first orbit data corresponding to said plurality of navigation satellites to generate said first orbit information;

second means for obtaining second orbit information corresponding to said space system, said second means including second processing means for processing second orbit data corresponding to said plurality of navigation satellites to generate said second orbit information, wherein said second processing means is different from said first processing means and said second orbit data is different from said first orbit data; and third means for determining realtime orbit information of the space system using both of said first orbit information and said second orbit information, wherein the accuracy of said real time orbit information does not depend on the relative location of the space system with respect to a ground based reference location.

30. The apparatus, as claimed in claim 29, wherein:

said first means is located at a first location and said second means is located at a second location that is remote from said first location.

31. The apparatus, as claimed in claim 29, wherein:

said first orbit information includes global positioning system (GPS) satellite orbit information that is propagated forward in time.

32. The apparatus, as claimed in claim 31, wherein:

said first means includes an uplink transmitter for transmitting said first orbit information to said space system.

33. The apparatus, as claimed in claim 29, wherein:

said first orbit data is received by said first means at a substantially different time from said second orbit data being received by said second means.

34. The apparatus, as claimed in claim 29, wherein:

said first means receives said first orbit data from a network of ground stations.

35. The apparatus, as claimed in claim 29, wherein:

said third means includes a Kalman filter.

36. A method for determining real time orbit information of a space system, comprising:

obtaining, at a control center, first orbit information relating to a plurality of space vehicles;

processing, at said control center, said first orbit information to create second orbit information relating to said plurality of space vehicles;

uploading said second orbit information to said space system;

receiving third orbit information relating to said plurality of space vehicles directly from said plurality of space vehicles at said space system, wherein said third orbit information is different from said second orbit information; and using said second orbit information and said third orbit information to estimate orbit information of said space system in substantially real time.

37. The method, as claimed in claim 36, wherein:

said step of processing includes propagating said first orbit information forward in time.

38. The method, as claimed in claim 36, wherein:

said step of uploading said second orbit information does not have to be performed in real time.

* * * * *